United States Patent
Jang et al.

(10) Patent No.: US 8,340,858 B2
(45) Date of Patent: Dec. 25, 2012

(54) METHOD AND SYSTEM FOR MOTOR TORQUE CONTROL FOR VEHICLES WHEN A CURRENT SENSOR IS NOT OPERATING PROPERLY

(75) Inventors: Jihoon Jang, Torrance, CA (US); Bon Ho Bae, Torrance, CA (US); Wei D. Wang, Troy, MI (US); Jeong J. Park, Ann Arbor, MI (US); Harry J. Bauer, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 287 days.

(21) Appl. No.: 12/784,792

(22) Filed: May 21, 2010

(65) Prior Publication Data

US 2011/0288699 A1   Nov. 24, 2011

(51) Int. Cl.
*G06F 7/00* (2006.01)
(52) U.S. Cl. ...................... 701/29.2; 701/29.7
(58) Field of Classification Search .............. 180/65.1, 180/65.21, 65.26, 65.265, 65.285, 242; 318/671; 701/22, 29.2, 29.7, 70, 82; 903/906, 930
See application file for complete search history.

(56) References Cited

U.S. PATENT DOCUMENTS 7,205,731 B2 *   4/2007   Nagayama .................... 318/139
2010/0295500 A1 *  11/2010   Chakrabarti et al. ......... 318/812

OTHER PUBLICATIONS

Novotny, D.W., et al. "Introduction to AC Drives," Vector Control and Dynamics of AC Drives, 1996, pp. 14-27, Clarendon Press, Oxford University Press, Oxford, New York.
Leonhard, W., "Control of Induction Motor Drives," Control of Electrical Drives, 3rd Edition, Sep. 30, 2001, pp. 242-246, Springer Berlin Heidelberg.

* cited by examiner

*Primary Examiner* — Ruth Ilan
*Assistant Examiner* — Robert A Coker
(74) *Attorney, Agent, or Firm* — Ingrassia Fisher & Lorenz, P.C.

(57) ABSTRACT

Methods and systems for controlling motor torque in a hybrid vehicle are provided. A current sensor provides a feedback current when the sensor is operating properly. A processor controls the motor torque using the feedback current if the current sensor is operating properly. The processor controls the motor torque using a slip value for the hybrid vehicle if the current sensor is not operating properly.

20 Claims, 6 Drawing Sheets

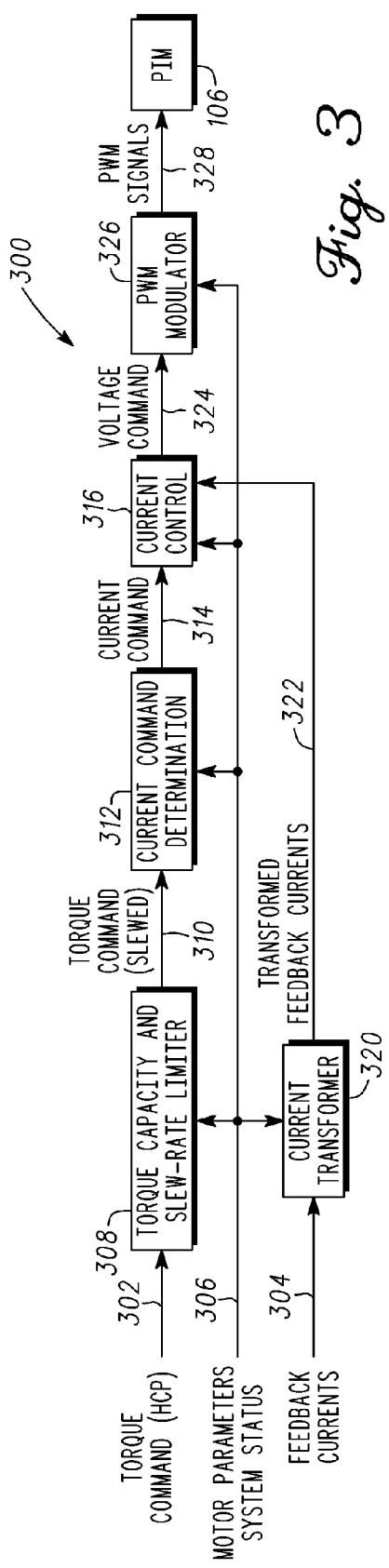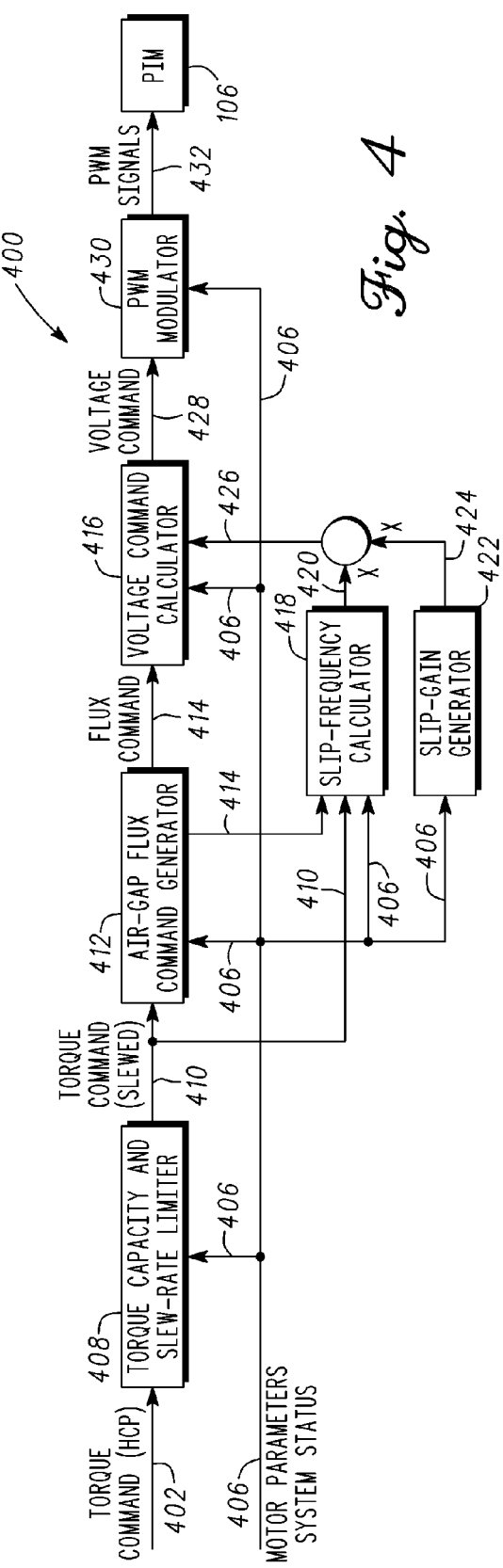

METHOD AND SYSTEM FOR MOTOR TORQUE CONTROL FOR VEHICLES WHEN A CURRENT SENSOR IS NOT OPERATING PROPERLY

TECHNICAL FIELD

The present invention generally relates to the field of hybrid vehicles and, more specifically, to methods and systems for controlling motor torque in vehicles when a current sensor of the vehicle is not operating properly.

BACKGROUND OF THE INVENTION

Many automobiles today are hybrid vehicles that utilize two or more propulsion systems. Various different categories of hybrid vehicles exist today. For example, certain hybrid vehicles (often referred to as mild hybrid vehicles) utilize an electric motor and battery to assist an internal combustion engine for operation of the vehicle. Other hybrid vehicles (often referred to as full hybrid vehicles) have separate propulsion systems (namely, an electric motor and battery propulsion system and an internal combustion engine propulsion system) that can assist one another or operate independently from one another depending on the circumstances for operation of the vehicle. Yet other hybrid vehicles (often referred to as plug-in hybrid vehicles) predominantly utilize an electric motor and battery propulsion system for operation of the vehicle, but also have a back-up internal combustion engine propulsion system for use when necessary.

Hybrid vehicles operate in part on motor torque that is provided to an electric motor of the hybrid system. Motor torque for hybrid vehicles is typically controlled based on electric feedback current using an electric current sensor of the vehicle. However, if the electric current sensor is not operating properly, it may be difficult to optimally control the motor torque, which can result in shutting down the hybrid vehicle component. In addition, for mild hybrid vehicles, the vehicle may not be able to operate under such circumstances.

SUMMARY

In accordance with an exemplary embodiment, a method for operating a hybrid vehicle having a current sensor is provided. The method comprises the steps of controlling the motor torque using a feedback current from the current sensor if the current sensor is operating properly, and controlling the motor torque using a slip value for the hybrid vehicle if the current sensor is not operating properly.

In accordance with another exemplary embodiment, a method for operating a hybrid controlling motor torque in a hybrid vehicle having a current sensor is provided. The method comprises the steps of controlling the motor torque using a first motor torque limit if the current sensor is operating properly, and controlling the motor torque using a second motor torque limit if the current sensor is not operating properly, the second motor torque limit being less than the first motor torque limit.

In accordance with a further exemplary embodiment, a system for controlling motor torque in a hybrid vehicle is provided. The system comprises a sensor and a processor. The sensor is configured to provide a feedback current when the sensor is operating properly. The processor is coupled to the sensor. The processor is configured to control the motor torque using the feedback current from the sensor if the sensor is operating properly, and to control the motor torque using a slip value for the hybrid vehicle if the sensor is not operating properly.

Furthermore, other desirable features and characteristics of the methods and systems will be apparent from the subsequent detailed description and the appended claims, taken in conjunction with the accompanying drawings and the foregoing technical field and background.

BRIEF DESCRIPTION OF THE DRAWINGS

The present disclosure will hereinafter be described in conjunction with the following drawing figures, wherein like numerals denote like elements, and wherein:

FIG. 3 is a flowchart of a sub-process of the process of FIG. 2, namely a normal or typical sub-process or method for controlling motor torque for a vehicle when current sensors, such as current sensors the system of FIG. 1, are operating properly;

FIG. 4 is a flowchart of another sub-process of the process of FIG. 2, namely a back-up sub-process or method for controlling motor torque for a vehicle when a current sensor, such as a current sensor of the system of FIG. 1, is not operating properly, in accordance with an exemplary embodiment;

DETAILED DESCRIPTION

The following detailed description is merely exemplary in nature and is not intended to limit the invention or the application and uses of the invention.

Figure 1:
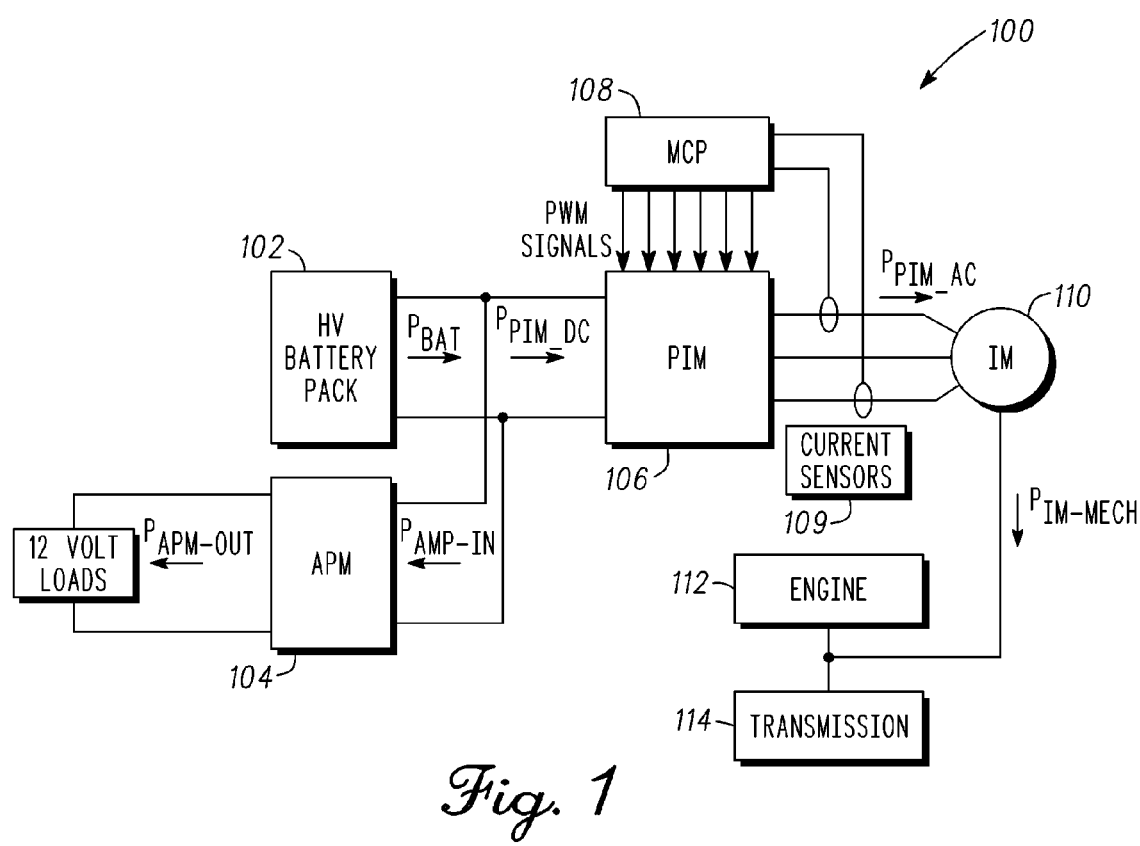
FIG. 1 is a block diagram of an exemplary system for controlling motor torque and propulsion for a hybrid vehicle, such as an automobile, in accordance with an exemplary embodiment.

FIG. 1 is a block diagram of an exemplary system 100 for controlling motor torque and propulsion for a hybrid vehicle, in accordance with an exemplary embodiment. The system 100 allows for optimized motor torque control for the hybrid vehicle using different techniques depending on whether current sensors 109 are operating correctly. The system 100 controls motor torque based on feedback current provided by the current sensors 109 if the current sensors 109 are operating properly, and based on a back-up method using calculated slip values and a motor toque limit if the current sensors 109 are not operating properly. The system 100 preferably comprises a power train for an automobile, such as a sedan, a sport utility vehicle, a van, or a truck. However, this may vary, for example in that the system 100 may also be used in other types of hybrid vehicles.

As depicted in FIG. 1, the system 100 comprises a battery 102, an accessory power module (APM) 104, a power inverter module (PIM) 106, a motor control processor (MCP) 108, one or more current sensors 109 (referenced above), an induction machine (IM) 110, an engine 112, and a transmission 114. The battery 102 preferably comprises a high voltage (HV) battery pack. The battery 102 provides high voltage power for both the APM 104 and the PIM 106.

The APM 104 is an electric current converter, and is coupled between the battery 102 and the PIM 106. The APM 104 is preferably a direct current (DC) to direct current (DC) converter. The APM 104 converts the high voltage power received from the battery 102 to a lower voltage power (preferably, having twelve volt loads) therefrom. The APM 104 converts high-voltage power to low-voltage power. In one embodiment, the APM 104 supplies the lower voltage power to the PIM 106. The input and output of the APM 104 are both direct current (DC).

The PIM 106 is an inverter, and is coupled between the battery 102, the APM 104, the MCP 108, and the induction machine 110. The PIM 106 and the APM 104 are preferably connected in parallel. Accordingly, a portion of the high voltage power from the battery 102 is provided directly to the APM 104, while another portion of the high voltage power from the battery 102 is provided directly to the PIM 106. The PIM 106 receives high voltage power from the battery 102 and lower voltage power (preferably, having twelve volt loads) from the APM 104. The PIM 106 generates and provides regenerative torque to the engine 112 and the transmission 114 via the induction machine 110 during regenerative operation of the system 100.

The current sensors 109 include electric current sensors, and are coupled between the PIM 106 and the MCP 108. The current sensors 109 measure current from the PIM 106, and provide output signals (preferably digital output) that quantifies a magnitude of the measured current (also referred to as feedback current herein) via feedback current signals to the MCP 108 when the current sensors 109 are operating properly.

The MCP 108 is coupled between the current sensors 109 and the PIM 106. The MCP 108 receives the feedback current signals from the current sensors 109 and processes the feedback current signals. The MCP 108 provides pulse width modulation (PWM) signals to the PIM 106 that control the motor torque provided to the engine 112 and the transmission 114 via the induction machine (IM) 110.

The MCP 108 preferably performs the computation and control functions of the system 100, and may be implemented with any type of processor or multiple processors, single integrated circuits such as a microprocessor, or any suitable number of integrated circuit devices and/or circuit boards working in cooperation to accomplish the functions of a processing unit. During operation, the MCP 108 may execute one or more programs contained within a memory (not depicted) in controlling the operation of the system 100.

The induction machine (IM) 110 comprises an electrical motor. The induction machine 110 is coupled to the engine 112 and the transmission 114, preferably via a belt. The induction machine 110 powers the engine 112 and the transmission 114. Specifically, the induction machine 110 provides assistive torque to the engine 112 and the transmission 114 during torque assist operation of the system 100. In addition, the induction machine 110 generates regenerative torque and provides the regenerative torque to the transmission 114 during regenerative operation of the system 100.

The engine 112 is coupled to the transmission 114. The transmission 114 is coupled to the vehicle's wheels (not depicted). Positive torque from the engine 112 propels the vehicle forward via the transmission 114 and the wheels. When the vehicle decelerates, the torque path is reversed and the wheels back drive the transmission 114, which in turn back-drives the engine 112.

The system 100 controls motor torque based on feedback current provided by the current sensors 109 if the current sensors 109 are operating properly, and based on a back-up method using calculated slip values and a modified (preferably, reduced) motor toque limit if the current sensors 109 are not operating properly. Accordingly, the system 100 may be utilized to provide and control motor torque even if one or more of the current sensors 109 are not operating properly.

Figure 2:
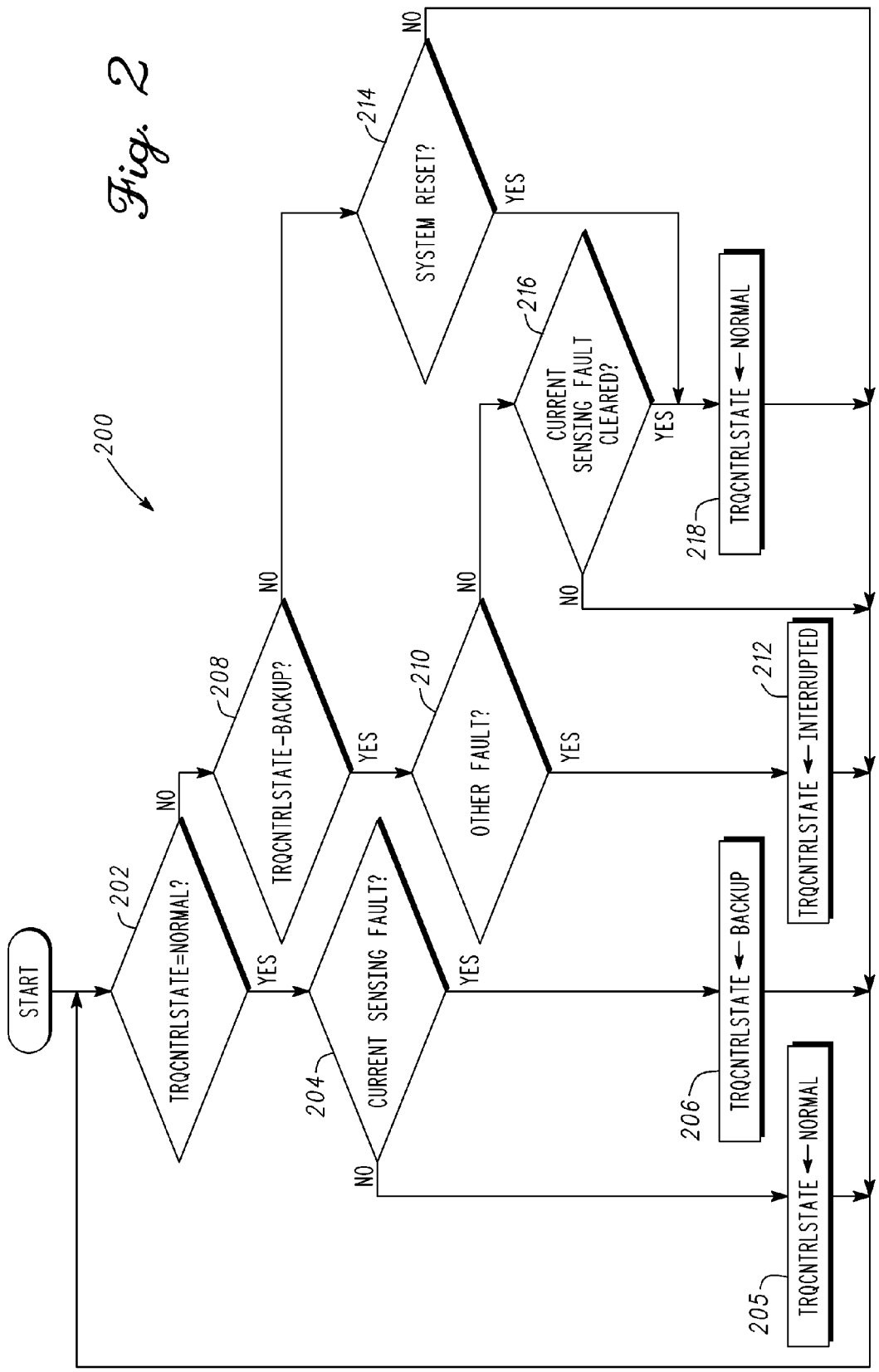
FIG. 2 is a flowchart of a process for controlling motor torque for a hybrid vehicle, and that can be utilized in connection with the system of FIG. 1, in accordance with an exemplary embodiment.

FIG. 2 is a flowchart of a process 200 for controlling motor torque for a hybrid vehicle, in accordance with an exemplary embodiment. The process 200 allows for optimized motor torque control for the hybrid vehicle using a normal method (depicted in FIG. 3) when the current sensors are operating properly, and using a back-up method (depicted in FIG. 4) when the current sensors are not operating properly. The process 200 can be utilized in connection with the system 100 of FIG. 1 in controlling the motor torque provided by the PIM 106 and the induction machine 110 in accordance with pulse width modulation signals provided by the MCP 108 to the PIM 106.

As depicted in FIG. 2, the process 200 begins with a determination as to whether a current torque control state for a vehicle system, such as the system 100, is a normal state (step 202). The current torque control state preferably automatically comprises a normal state during a first iteration of step 202. In subsequent iterations of step 202, the current torque control state preferably continues to comprise a normal state unless a back-up torque control is currently being used in accordance with an immediately prior iteration of the process 200. This determination is made by a processor, such as the MCP 108 of FIG. 1.

If it is determined in step 202 that the current torque control state is normal, then a determination is made as to whether a current sensing fault is present (step 204). A current sensing fault is present when one or more of the current sensors 109 of FIG. 1 are not operating properly. This determination is made by a processor, such as the MCP 108 of FIG. 1, based on feedback current signals (or the absence thereof) provided by the current sensors 109 of FIG. 1. A current sensing fault may be determined based on whether signals form the current sensors 109 are not being provided as expected. A current sensing fault may also occur if the values provided by the current sensors 109 are not in accordance with expected values or boundaries.

If it is determined in step 204 that a current sensing fault is not present, the torque control state remains in the normal state (step 205). While the torque control state is in the normal state, the motor torque is controlled using a typical or normal method wherein the torque is determined based on a torque command and feedback currents. The MCP 108 of FIG. 1 keeps the torque control state in the normal state, and controls the motor torque using the normal method in accordance with pulse width modulation signals provided to the PIM 106 of FIG. 1. Following step 205, the process returns to step 202 with a new iteration.

Turning now to FIG. 3, a flowchart is depicted for a method or sub-process 300 for controlling the motor torque using the normal method, in accordance with an exemplary embodiment. As depicted in FIG. 3, a torque command is determined or received (step 302). The torque command may be determined by the MCP 108 of FIG. 1 or received from another device or system, such as from another processor during step 302. The torque command may be calculated using the motor state, the battery voltages, and various motor parameters (such as certain inductances of the motor, a number of pole-pairs, a rotor resistance, a stator resistance, and/or other motor parameters).

In addition, one or more feedback currents are received (step 304). The feedback currents are preferably received by the MCP 108 of FIG. 1 from the current sensors 109 of FIG. 1.

A system status and various motor parameters are also received (step 306). The system status preferably pertains to an operating mode of the system 100 of FIG. 1, such as the torque assist mode or the regenerative braking mode described above in connection with FIG. 1. The motor parameters preferably include motor temperatures, inductances of the motor, the number of rotor poles, a rotor resistance, a stator resistance, and/or other motor parameters. The system status and motor are preferably received by the MCP 108 from various sensors and/or other processors and/or systems (not depicted in FIG. 1).

The torque command of step 302 and the system status and motor parameters of step 306 are processed using a torque capacity and slew-rate limiter 308 step or algorithm 308 in order to generate a slewed torque command (step 310). The slewed torque command is preferably generated by the MCP 108 of FIG. 1 using the torque command of step 302 and the system status and motor parameters of step 306.

The slewed torque command of step 310 is processed, along with the system status and motor parameters of step 306, using a current command determination 312 step or algorithm in order to generate current commands (step 314). The current commands preferably comprise current commands in the d and q synchronous reference frames. The current commands are preferably calculated by the MCP 108 using the slewed torque command of step 310 and the system status and the motor parameters of step 306.

In addition, the feedback currents of step 304 are processed using a current transformer determination 320 step or algorithm in order to generate transformed feedback currents (step 322) based upon the feedback currents. The transformed feedback currents preferably correspond to the synchronous d, q reference frames mentioned above. The transformed feedback currents are preferably generated in step 322 by the MCP 108.

A current controller 316 step or algorithm is used to generate a voltage command using the current command of step 314, the system status and motor parameters of step 306, and the transformed feedback currents of step 322 (step 324). The current controller 316 regulates the transformed feedback currents of step 322 so that they track and are consistent with the current command of step 314. The current controller 316 is preferably implemented in step 324 by the MCP 108 of FIG. 1.

A pulse width modulation (PWM) modulator 326 step or algorithm is used to generate pulse width modulation signals using the voltage command of step 324 and the system status and motor parameters of step 306 (step 328). The pulse width modulation signals are preferably generated using the MCP 108 of FIG. 1, and are preferably provided to the PIM 106 for controlling the motor torque for the system 100 of FIG. 1, and thereby controlling the motor torque for the vehicle.

Returning to FIG. 2, if it is determined in step 204 that a current sensing fault is present, the torque control state is changed to a back-up state (step 206). While the torque control state is in the back-up state, the motor torque is controlled using a back-up method. The change in the torque control state and the control of the motor torque using the back-up method is performed by the MCP 108 of FIG. 1 in accordance with pulse width modulation signals provided to the PIM 106 of FIG. 1. Following step 206, the process returns to step 202 with a new iteration.

With reference to FIG. 4, a flowchart is provided for a back-up method or sub-process 400 for controlling the motor torque using the back-up method, in accordance with an exemplary embodiment. As depicted in FIG. 4, the process begins with the determination of a torque command (step 402). The torque command may be determined by the MCP 108 of FIG. 1 or received from another device or system, such as from another processor during step 402. The torque command may be calculated using the motor state, the battery voltages, and various motor parameters (such as certain inductances of the motor, the number of rotor poles, a rotor resistance, a stator resistance, and/or other motor parameters).

A system status and various motor parameters are also received (step 406). The system status preferably pertains to an operating mode of the system 100 of FIG. 1, such as the torque assist mode or the regenerative braking mode described above in connection with FIG. 1. The motor parameters preferably include motor temperatures, inductances of the motor, the number of rotor poles, a rotor resistance, a stator resistance, and/or other motor parameters. The system status and motor are preferably received by the MCP 108 from various sensors and/or other processors and/or systems (not depicted in FIG. 1).

The torque command of step 402 and the system status and motor parameters of step 406 are processed using a torque capacity and slew-rate limiter 408 step or algorithm 308 in order to generate a slewed torque command (step 410). The slewed torque command is preferably generated by the MCP 108 of FIG. 1 using the torque command of step 402 and the system status and motor parameters of step 406.

The slewed torque command of step 410 is processed, along with the system status and motor parameters of step 406, using an air-gap flux command generator 412 step or algorithm in order to generate a flux command (step 414). The flux command is preferably generated by the MCP 108 of FIG. 1 using the following equations:

$$\lambda_a^{**} = \lambda_{slope}|T_e^*| + \lambda_{offset}, \quad \text{(Equation 1)}$$
and
$$\lambda_a^* = \begin{cases} \lambda_{a,max}, & \text{if } \lambda_a^{} \geq \lambda_{a,max} \\ \lambda_a^{}, & \text{otherwise} \end{cases}, \quad \text{(Equation 2)}$$

in which $T_e^*$ represents the commanded torque of step 402, $\lambda_{slope}$ represents the flux slope, $\lambda_{offset}$ represents the flux offset, $\lambda_{a,max}$ represents a maximum value of the flux, $\lambda^{**}_a$ represents an intermediate flux command value, and $\lambda^*_a$ represents a final flux command value.

The slewed torque command of step 410, the system status and motor parameters of step 406, and the flux command of step 414 are then processed by a slip-frequency calculator 418 step or algorithm to generate a slip frequency (step 420). The slip frequency is preferably generated by the MCP 108 of FIG. 1 using the following equation:

$$\omega_{sl}^{**} = \frac{2}{3} \frac{R_r}{P_p} \frac{1}{\lambda_a^{*2}} T_e^*, \quad \text{(Equation 3)}$$

in which $w^{**}{}_{sl}$ represents the slip frequency, $R_r$ represents a rotor resistance of the electric motor, $P_p$ represents a number of pole-pairs of the electric motor, $\lambda^*{}_a$ represents the final flux command value of step 414, and $T^*{}_e$ represents the slewed torque command of step 410.

In addition, a slip-gain generator 422 step of algorithm is used to generate a slip gain (step 424). The slip gain is preferably generated by the MCP 108 of FIG. 1 using a look-up table stored in a memory (not depicted) relating a slip or compensation gain ($K_{sl}$) and the system status and motor parameters of step 406, including a motor speed (preferably pertaining to the PIM 106 of FIG. 1).

The slip gain of step 424 is then multiplied by the slip frequency of step 420 to generate a slip frequency command (step 426). The slip frequency command is preferably generated by the MCP 108 of FIG. 1 in accordance with the following equation:

$$\omega_{sl}^* = \omega_{sl}^{**} K_{sl} \quad \text{(Equation 4)},$$

in which $w^*{}_{sl}$ is the slip frequency command, $w^{}{}_{sl}$ is the slip frequency of step 420, and $K_{sl}$ is the slip gain of step 424**.

The slip frequency command of step 426, the system status and motor parameters of step 406 (including the motor speed), and the flux command of step 414 are then processed by a voltage command calculator 416 step or algorithm to generate a voltage commands (step 428). The voltage command is preferably generated by the MCP 108 of FIG. 1 using the following equation:

$$V_s^{**} = (\omega_r + \omega_{sl}^*)\lambda_a^* \quad \text{(Equation 5)},$$

in which $V^{**}{}_s$ represents the voltage magnitude command, $\omega_r$ represents the wheel resistance, $w^*{}_{sl}$ represents the slip frequency command of step 426, and $\lambda^*{}_a$ represents the flux command value of step 414.

A pulse width modulation (PWM) modulator 430 step or algorithm is used to generate pulse width modulation signals using the voltage command of step 428 and the system status and motor parameters of step 406 (step 432). The pulse width modulation signals are preferably generated using the MCP 108 of FIG. 1, and are preferably provided to the PIM 106 for controlling the motor torque for the system 100 of FIG. 1, and thereby controlling the motor torque for the vehicle.

Figure 5:
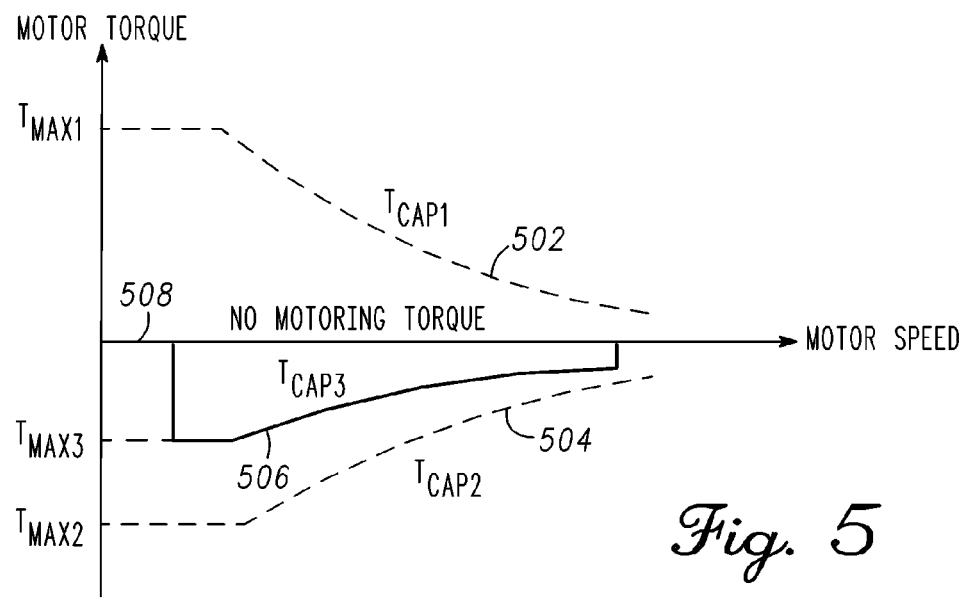
FIG. 5 is a graphical representation of a step of the sub-process of FIG. 4, namely the step of modifying a motor torque capacity in accordance with an exemplary embodiment.

With reference to FIG. 5, a graphical depiction of the modification of step 430 is depicted in accordance with an exemplary embodiment. Specifically, FIG. 5 depicts a first cap 502, a second cap 504, a third cap 506, and a zero level 508. The first cap 502 represents a maximum available torque that may be used in certain embodiments in normal or typical situations in which the current sensors are functioning (such as in the normal method 300 of FIG. 3) and the system 100 of FIG. 1 is operating in a torque assist mode in which the system 100 is assisting with vehicle torque. The second cap 504 represents a maximum available torque that may be used in certain embodiments in normal or typical situations in which the current sensors are functioning (such as in the normal method 300 of FIG. 3) and the system 100 of FIG. 1 is operating in a regenerative operating mode in which the system 100 is providing energy regeneration.

The third cap 506 represents an adjusted maximum torque capacity using the back-up method 400 of FIG. 4, in situations in which one or more current sensors are not operating properly. As depicted in FIG. 5, at each particular motor speed, the third cap 506 preferably has a magnitude with an absolute value that is greater than the zero level 508 but less than each of the first cap 502 and the second cap 504. The use of the third cap 506 helps to ensure that the motor torque provides the necessary power to operate the vehicle but also stays within a safe range of operation without the feedback current from the current sensors. The third cap 506 preferably represents a fixed value for the vehicle, at which sufficient motor torque will be provided to operate the vehicle (preferably, with a twelve volt supply), but at which the motor torque is unlikely to result in any damage to any vehicle systems or components regardless of the measure of the current from the PIM 106 of FIG. 1.

In addition, the d, q voltage commands are adjusted for a modified motor torque slew rate (step 432). Specifically, the d, q voltage commands are adjusted in accordance with a modified motor torque slew rate to help further ensure that the motor torque remains in a safe range during operation of the system 100 of FIG. 1. The adjustment of step 432 is preferably conducted by the MCP 108 of FIG. 1.

Figure 6:
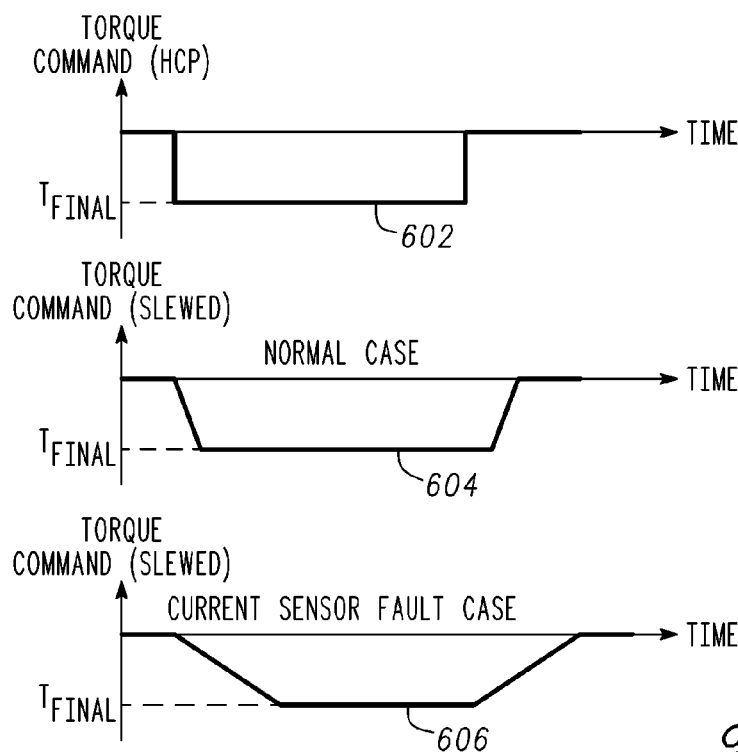
FIG. 6 is a graphical representation of another step of the sub-process of FIG. 4, namely the step of modifying a motor torque slew rate, in accordance with an exemplary embodiment.

With reference to FIG. 6, a graphical depiction of the modification of step 432 is depicted in accordance with an exemplary embodiment. Specifically, FIG. 6 depicts a first slew rate 602, a second slew rate 604, and a third slew rate 606. The first slew rate 602 represents a motor torque slew rate for the slewed torque command of step 310 of FIG. 3 or step 402 of FIG. 4. The second slew rate 604 represents a motor torque slew rate that can be used in certain embodiments for the processing of the internal torque command in normal or typical situations in which the current sensors are functioning (such as in the normal method 300 of FIG. 3) and the system 100 of FIG. 1.

The third slew rate 606 represents a motor torque slew rate for the processing of the internal torque command using the back-up method 400 of FIG. 4 in situations in which one or more current sensors are not operating properly. As depicted in FIG. 6, the processing is more gradual for the third slew rate 606, as it takes longer for the internal command to reach the actual torque command in response to upward or downward changes in the actual torque command. This gradual processing in the back-up method helps to ensure that the motor torque stays within the safe range in which at which sufficient motor torque will be provided to operate the vehicle (preferably, with a twelve volt supply), but at which the motor torque is unlikely to result in any damage to any vehicle systems or components regardless of the measure of the current from the PIM 106 of FIG. 1. For example, changes in the torque are implemented more gradually using the back-up method to allow for the additional calculations described above in connection with FIG. 4 during situations in which one or more of the current sensors are not operating properly and the feedback current is therefore unavailable or less reliable than under normal conditions.

The d, q voltage commands of steps 428 are adjusted in accordance with the adjustments of step 430 and 432 of FIG. 4, thereby generating adjusted d, q voltage commands (step 434). Specifically, the d, q voltage commands of step 428 are preferably limited to respective maximum values corresponding to an upper bound of a safe region based on the adjustments in steps 430 and 432, to thereby generate the adjusted d, q voltage commands of step 434. The adjusted d, q voltage commands of step 434 are preferably generated by the MCP 108 of FIG. 1. The motor torque is controlled by the MCP 108 of FIG. 1 via the pulse width modulation signals provided by the MCP 108 to the PIM 106 of FIG. 1 based on the adjusted voltage commands of step 434.

With further reference to step 206 of FIG. 2, the change in the torque control state to the back-up state includes a gradual transition to use of the back-up method 400 of FIG. 4. The transition preferably begins with an initialization of the back-up method (as described further below in connection with the initialization 700 of FIG. 7), in which the PIM 106 of FIG. 1 is turned off until the calculations are completed and the back-up method is ready to control the motor torque. The back-up method is then set and takes effect (as described further below in connection with the setting 702 of FIG. 7).

Returning now to step 202, if it is determined in step 202 that the current torque control state is not normal, then a determination is made as to whether the current torque control state corresponds to a back-up state (step 208). The current torque control state comprises a back-up state if the back-up method 400 of motor torque control of FIG. 4 is currently being used in accordance with an immediately prior iteration of the process 200. This determination is preferably made by the MCP 108 of FIG. 1.

If it is determined in step 208 that the current torque control state corresponds to the back-up state, then a determination is made as to whether there are any other faults associated with the system (step 210). The determination of step 210 preferably comprises a determination as to whether there are any faults associated with the system 100 of FIG. 1 other than possible current sensor faults. This determination is preferably made by the MCP 108 of FIG. 1.

If it is determined in step 210 that one or more other faults currently exist, then the torque control state is change to an interrupted state (step 212). While in the interrupted state, the system 100 of FIG. 1 preferably ceases motor torque control. The process then returns to step 202 with a new iteration. The torque control state preferably remains in the interrupted state until there is a determination in a subsequent iteration of step 210 that there are no other such faults in the system.

Returning now to step 210, if it is determined that there are no such other faults, then a determination is made as to whether a current sensing fault has been cleared (step 216). The current sensing fault is preferably determined to be cleared when the current sensors are now all operating properly. For example, the current sensor fault may be determined to be cleared when a temporary current sensor fault occurs, for example in which the MCP 108 of FIG. 1 checks and detects the fault, the torque control method is changed to the back-up method accordingly, and subsequently the MCP 108 checks again and detects that the fault no longer exists.

If it is determined in step 216 that the current sensing fault has been cleared, then the torque control state is change to the normal state (step 218). While the torque control state is in the normal state, the motor torque is controlled using the normal method 300 described above in connection with step 205 and FIG. 3. The MCP 108 of FIG. 1 keeps the torque control state in the normal state, and controls the motor torque using the normal method in accordance with pulse width modulation signals provided to the PIM 106 of FIG. 1. Following step 218, the process returns to step 202 with a new iteration.

Preferably, when the torque control state is changed to the normal state in step 218, the change in torque control state includes a gradual transition to use of the normal method 300 of FIG. 3. The transition preferably begins with an exit from the back-up method (as described further below in connection with the exit 704 of FIG. 7), in which the system 100 of FIG. 1 is preparing to return the torque control state to the normal state while the motor torque is still commanded using the back-up method 400 of FIG. 4 and the motor torque is smoothly reduced to zero. The transition continues as the back-up method ends (as described further below in connection with the ending 706 of FIG. 7), in which the PIM 106 of FIG. 1 is temporarily turned off, and no motor torque is produced during this time. Once the system 100 of FIG. 1. is ready to begin controlling the motor torque using the calculations of the regular method 300 of FIG. 3, the PIM 106 of FIG. 1 is turned on, and the motor torque is controlled using the regular method.

Returning now to step 208, if it is determined that the current torque control state is not the back-up state, then a determination is made as to whether there has been any indication that the system has been re-set (step 214). This determination preferably corresponds to whether there has already been a re-set of the torque control state to the normal control state, for example as described below in connection with the re-set 708 of FIG. 7. This determination is preferably made by the MCP 108 of FIG. 1. If it is determined in step 214 that the system has been re-set, then the process proceeds to the above-described step 218. As mentioned above, during step 218, the torque control state is change to the normal state, and the motor torque is controlled using the normal method described above in connection with step 205 and FIG. 3. Following step 218, the process returns to step 202 with a new iteration.

Conversely, if it is determined in step 214 that the system has not been re-set, then the torque control state remains interrupted, and no motor torque is provided in this state. The process also returns to step 202 with a new iteration.

Figure 7:
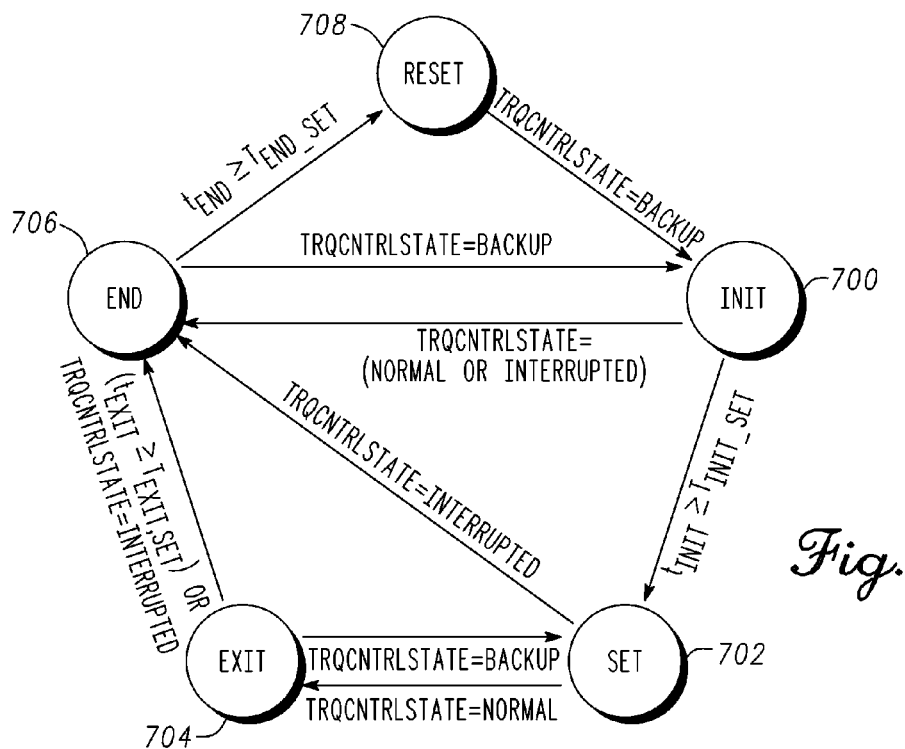
FIG. 7 is a flowchart depicting different operating states and transitions therebetween of the process of FIG. 2, in accordance with an exemplary embodiment.

FIG. 7 is a flowchart depicting different operating states and transitions therebetween of the process 200 of FIG. 2, in accordance with an exemplary embodiment. When a current sensor fault is detected and the operational state is transitioning to the back-up state (corresponding to step 206 of FIG. 2), an initialization 700 is conducted. During the initialization 700, the PIM 106 of FIG. 1 is turned off until the calculations are completed and the back-up method is ready to control the motor torque.

The back-up method is then set (702). The back-up state is now in effect. The PIM 106 of FIG. 1 is turned on, and the motor torque is controlled by the back-up method 400 of FIG. 4 in accordance with the modified capacity, as described above in connection with FIGS. 4-6.

Once it is determined that the current sensor (or a replacement current sensor) is operating properly and the normal method 300 of FIG. 3 can again be utilized, an exit 704 from the back-up method is conducted. The exit 704 indicates that the system 100 is preparing to return the operational state to the normal state and control the motor torque using the normal method 300 of FIG. 3. During the exit 704, the motor torque is still commanded using the back-up method 400 of FIG. 4. However, the motor torque is smoothly reduced to zero during the exit 704.

The back-up method ends (706) when the motor torque after the motor torque is smoothly reduced to zero. During the ending (706), the PIM 106 of FIG. 1 is temporarily turned off, and no motor torque is produced during this time.

The torque control state is then re-set (708). Specifically, once the system 100 of FIG. 1. is ready to begin controlling the motor torque using the calculations of the regular method 300 of FIG. 3, the PIM 106 of FIG. 1 is turned on, and the motor torque is controlled using the regular method. The motor torque continues to be controlled using the regular method following the reset 708 unless and until there is a determination that an initialization 700 of the back-up method is required (for example, if one of the current sensors 109 of FIG. is no longer operating properly).

Figure 8:
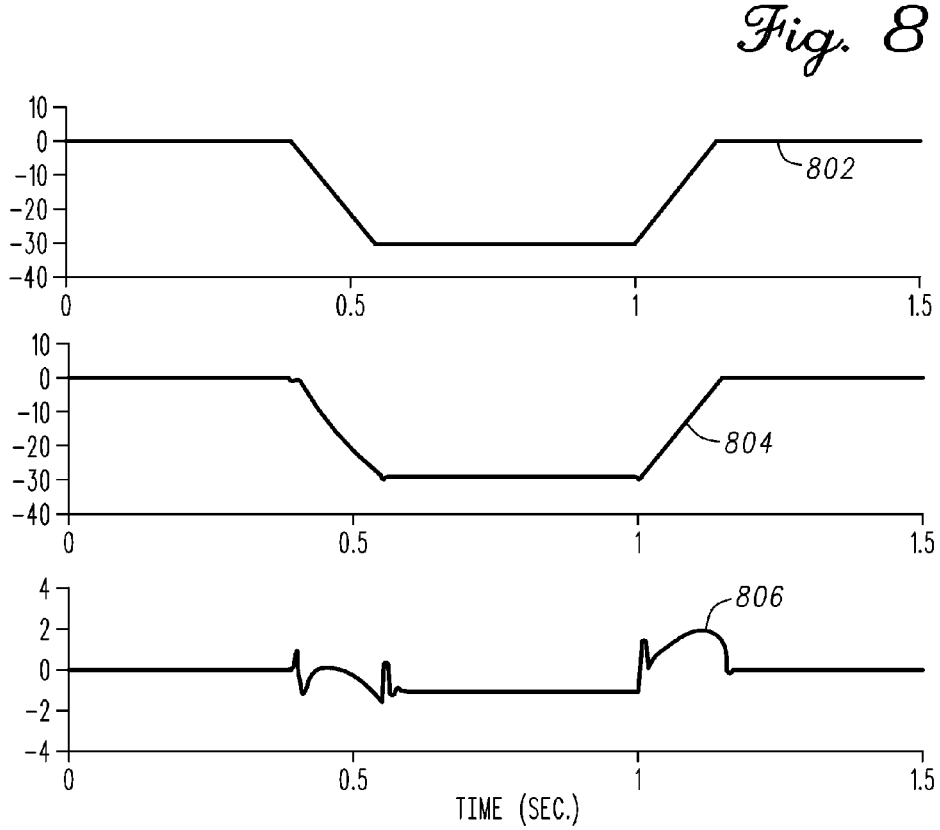
FIG. 8 is a graphical representation of typical motor vehicle behavior from implementing the process of FIG. 2 under certain motor torque transient conditions, in accordance with an exemplary embodiment.

FIG. 8 is a graphical representation of typical motor vehicle behavior from implementing the process 200 of FIG. 2 under certain torque transient conditions, in accordance with an exemplary embodiment. Specifically, FIG. 8 depicts a torque command 802, a resulting motor torque 804 provided in accordance with the process 200, and a torque error 806 over time. The torque error 806 is calculated as a difference between the motor torque 804 and the torque command 802 over time. The results of the torque command 802, the motor torque 804, and the torque error 806 are displayed in FIG. 8 under simulated conditions in which the motor torque is transient from zero Newton-meters (Nm) to negative thirty Newton-meters (Nm) and back to zero Newton-meters (Nm) as the motor speed remains constant at 1,200 revolutions per minute (RPM). As depicted in FIG. 8, the motor torque 804 closely follows the torque command 802, and the torque error 806 is relatively small, throughout the typical motor vehicle behavior of FIG. 8.

Figure 9:
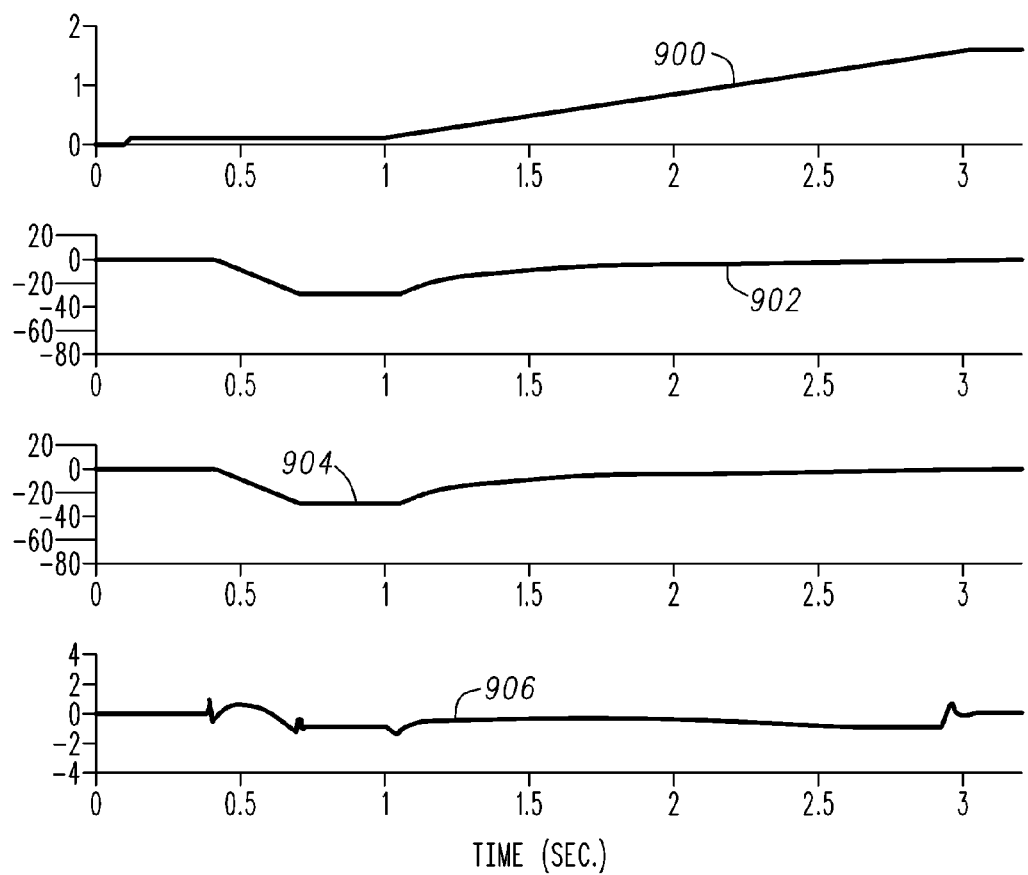
FIG. 9 is a graphical representation of typical motor vehicle behavior from implementing the process of FIG. 2 under certain motor speed transient conditions, in accordance with an exemplary embodiment.

FIG. 9 is a graphical representation of typical motor vehicle behavior from implementing the process 200 of FIG. 2 under certain speed transient conditions, in accordance with an exemplary embodiment. Specifically, FIG. 9 depicts a torque command 902, a resulting motor torque 904 provided in accordance with the process 200, and a torque error 906 over time and over various increasing motor speeds 900. The torque error 906 is calculated as a difference between the motor torque 904 and the torque command 902 over time and as the motor speed 900 increases. The results of the torque command 902, the motor torque 904, and the torque error 906 are displayed in FIG. 9 under simulated conditions in which the motor speed is increased from 1,200 revolutions per minute (RPM) to 15,600 revolutions per minute (RPM) over a time period of two seconds. As depicted in FIG. 9, the motor torque 904 closely follows the torque command 902, and the torque error 906 is relatively small, throughout the typical motor vehicle behavior of FIG. 9.

It will be appreciated that the disclosed methods and systems may vary from those depicted in the Figures and described herein. For example, as mentioned above, the system 100 of FIG. 1 may be disposed in whole or in part in any one or more of a number of different vehicle units, devices, and/or systems. In addition, it will be appreciated that certain steps of the processes, sub-processes, and/or implementations and/or typical motor vehicle behavior may vary from those depicted in FIGS. 2-9 and/or described herein in connection therewith. It will similarly be appreciated that certain steps of the processes, sub-processes, and/or implementations may occur simultaneously or in a different order than that depicted in FIGS. 2-7 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles and/or environments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for operating a hybrid vehicle having a current sensor, the method comprising the steps of:
controlling the motor torque using a feedback current from the current sensor if the current sensor is operating properly; and
controlling the motor torque using a slip value and a voltage magnitude for the hybrid vehicle if the current sensor is not operating properly.

2. The method of claim 1, wherein the step of controlling the motor torque using the slip value comprises the step of controlling the motor torque using a motor torque command, the slip value, the voltage magnitude, and a motor torque limit if the current sensor is not operating properly.

3. The method of claim 2, wherein the step of controlling the motor torque using the motor torque command, the slip value, and the motor torque limit comprises the step of controlling the motor torque using the motor torque command, the slip value, and a motor torque capacity limit if the current sensor is not operating properly.

4. The method of claim 2, wherein the step of controlling the motor torque using the motor torque command, the slip value, and the motor torque limit comprises the step of controlling the motor torque using the motor torque command, the slip value, and a motor torque slew rate limit if the current sensor is not operating properly.

5. The method of claim 2, further comprising the step of:
calculating a slip frequency using a plurality of motor parameters;
wherein the step of controlling the motor torque using the motor torque command and the slip value comprises the step of controlling the motor torque using the motor torque command and the slip frequency if the current sensor is not operating properly.

6. The method of claim 5, wherein the step of calculating the slip frequency comprises the step of calculating the slip frequency using a rotor resistance of the motor and a number of pole-pairs of the motor.

7. The method of claim 6, further comprising the steps of:
measuring a motor speed; and
calculating a slip gain using the motor speed;
wherein the step of controlling the motor torque command using the motor torque and the slip frequency comprises the step of controlling the motor torque using the motor torque command, the slip frequency, and the slip gain if the current sensor is not operating properly.

8. A method for controlling motor torque in a hybrid vehicle having a current sensor, the method comprising the steps of:
controlling the motor torque using a first motor torque limit if the current sensor is operating properly; and
controlling the motor torque using a second motor torque limit if the current sensor is not operating properly, the second motor torque limit being less than the first motor torque limit.

9. The method of claim 8, further comprising the step of:
receiving a torque command as a measure of desired torque for use in controlling the motor torque;
wherein the step of controlling the motor torque using the motor torque limit comprises the step of controlling the motor torque using the motor torque command and a motor torque capacity limit if the current sensor is not operating properly.

10. The method of claim 8, further comprising the step of:
receiving a torque command as a measure of desired torque for use in controlling the motor torque;
wherein the step of controlling the motor torque using the motor torque limit comprises the step of controlling the motor torque using the motor torque command and a motor torque slew rate limit if the current sensor is not operating properly.

11. The method of claim 8, further comprising the step of:
receiving a torque command as a measure of desired torque for use in controlling the motor torque;
wherein the step of controlling the motor torque using the second motor torque limit comprises the step of controlling the motor torque using the motor torque command, the second motor torque limit, and a slip value for the hybrid vehicle if the current sensor is not operating properly.

12. The method of claim 11, further comprising the step of:
calculating a slip frequency using a plurality of motor parameters;
wherein the step of controlling the motor torque using the motor torque command, the second motor torque limit, and the slip value comprises the step of controlling the motor torque using the motor torque command, the second motor torque limit, and the slip frequency if the current sensor is not operating properly.

13. The method of claim 12, further comprising the steps of:
measuring a motor speed; and
calculating a slip gain using the motor speed;
wherein the step of controlling the motor torque using the motor torque command, the second motor torque limit, and the slip frequency comprises the step of controlling the motor torque using the motor torque command, the second motor torque limit, the slip frequency, and the slip gain if the current sensor is not operating properly.

14. A system for controlling motor torque in a hybrid vehicle, the system comprising:
a sensor configured to provide a feedback current when the sensor is operating properly; and
a processor coupled to the sensor and configured to:
control the motor torque using the feedback current if the sensor is operating properly; and
control the motor torque using a slip value and a voltage magnitude for the hybrid vehicle if the sensor is not operating properly.

15. The system of claim 14, wherein the processor is further configured to:
control the motor torque using a motor torque command and the feedback current if the sensor is operating properly; and
control the motor torque using the motor torque command, the slip value, and the voltage magnitude if the sensor is not operating properly.

16. The system of claim 15, wherein the processor is further configured to control the motor torque using the motor torque command, the slip value, the voltage magnitude, and a motor torque limit if the sensor is not operating properly.

17. The system of claim 16, wherein the processor is further configured to control the motor torque using the motor torque command, the slip value, and a motor torque capacity limit if the sensor is not operating properly.

18. The system of claim 16, wherein the processor is further configured to control the motor torque using the motor torque command, the slip value, and a motor torque slew rate limit if the sensor is not operating properly.

19. The system of claim 15, wherein the processor is further configured to:
calculate a slip frequency using a plurality of motor parameters; and
control the motor torque using the motor torque command and the slip frequency if the sensor is not operating properly.

20. The system of claim 19, wherein the processor is further configured to:
obtain a motor speed;
calculate a slip gain using the motor speed; and
control the motor torque using the motor torque command, the slip frequency, and the slip gain if the sensor is not operating properly.

* * * * *